United States Patent
Li et al.

(10) Patent No.: US 11,295,472 B2
(45) Date of Patent: Apr. 5, 2022

(54) POSITIONING METHOD, POSITIONING APPARATUS, POSITIONING SYSTEM, STORAGE MEDIUM, AND METHOD FOR CONSTRUCTING OFFLINE MAP DATABASE

(71) Applicant: BOE TECHNOLOGY GROUP CO., LTD., Beijing (CN)

(72) Inventors: Yue Li, Beijing (CN); Tong Liu, Beijing (CN); Jingtao Xu, Beijing (CN); Kai Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 76 days.

(21) Appl. No.: 16/641,359

(22) PCT Filed: May 17, 2019

(86) PCT No.: PCT/CN2019/087411
§ 371 (c)(1),
(2) Date: Feb. 24, 2020

(87) PCT Pub. No.: WO2019/219077
PCT Pub. Date: Nov. 21, 2019

(65) Prior Publication Data
US 2020/0226782 A1    Jul. 16, 2020

(30) Foreign Application Priority Data
May 18, 2018  (CN) ........................ 201810482202.2

(51) Int. Cl.
*G06T 7/73*    (2017.01)
*G06K 9/46*    (2006.01)
(Continued)

(52) U.S. Cl.
CPC .............. *G06T 7/74* (2017.01); *G06K 9/4676* (2013.01); *G06K 9/6201* (2013.01); *G06T 3/40* (2013.01);
(Continued)

(58) Field of Classification Search
CPC ........... G06K 9/00664; G06K 9/00791; G06K 9/4676; G06K 9/6201; G06T 2207/10016;
(Continued)

(56) References Cited

U.S. PATENT DOCUMENTS 8,060,254 B2    11/2011  Myeong et al.
8,427,472 B2 *   4/2013  Moravec .............. G05D 1/0251
                                                      345/420
(Continued)

FOREIGN PATENT DOCUMENTS

CN    105865449 A    8/2016
CN    106352877 A    1/2017
(Continued)

OTHER PUBLICATIONS

International Search Report of PCT/CN2019/087411 in Chinese, dated Aug. 19, 2019, with English translation.
(Continued)

Primary Examiner — Ian L Lemieux
(74) Attorney, Agent, or Firm — Collard & Roe, P.C.

(57) ABSTRACT

A positioning method, a positioning device, a positioning system, a storage medium, and a construction method for an offline map database. The positioning method includes: obtaining a current image information, and extracting a visual feature in the current image information; matching the visual feature in the current image information with a key frame in an offline map database, and determining a candidate key frame similar to the visual feature in the current image information, wherein the offline map database is
(Continued)

generated based on a global grid map and a visual map; and determining a pose corresponding to the candidate key frame, and converting the pose to coordinate values.

11 Claims, 5 Drawing Sheets

(51) Int. Cl.
*G06K 9/62* (2022.01)
*G06T 3/40* (2006.01)
(52) U.S. Cl.
CPC ............... *G06T 2207/10016* (2013.01); *G06T 2207/10044* (2013.01); *G06T 2207/30244* (2013.01)
(58) Field of Classification Search
CPC . G06T 2207/10044; G06T 2207/30244; G06T 3/40; G06T 7/73; G06T 7/74
See application file for complete search history.

(56) References Cited

U.S. PATENT DOCUMENTS

| | | | | |
|---|---|---|---|---|
| 8,996,292 | B2* | 3/2015 | Park | G09B 29/00 701/300 |
| 10,482,619 | B2* | 11/2019 | Ebrahimi Afrouzi | G05D 1/0227 |
| 2005/0182518 | A1* | 8/2005 | Karlsson | G05D 1/0272 700/253 |
| 2018/0066945 | A1* | 3/2018 | Meier | G01C 21/206 |
| 2018/0189565 | A1* | 7/2018 | Lukierski | A47L 9/009 |
| 2018/0268237 | A1* | 9/2018 | Stanimirovic | G06K 9/2018 |
| 2019/0304150 | A1* | 10/2019 | Zweigle | H04N 13/271 |
| 2020/0050208 | A1* | 2/2020 | Frick | A01D 34/824 |
| 2020/0225673 | A1* | 7/2020 | Ebrahimi Afrouzi | G05D 1/0214 |
| 2020/0226782 | A1 | 7/2020 | Li et al. | |
| 2020/0334841 | A1* | 10/2020 | Cristobal | G06T 7/579 |
| 2020/0334842 | A1* | 10/2020 | Michielin | G06T 15/10 |
| 2021/0042958 | A1* | 2/2021 | Engel | G06T 7/74 |

FOREIGN PATENT DOCUMENTS

| | | |
|---|---|---|
| CN | 107193279 A | 9/2017 |
| CN | 107677279 A | 2/2018 |
| CN | 107742311 A | 2/2018 |
| CN | 108717710 A | 10/2018 |
| KR | 20070120780 A | 12/2007 |

OTHER PUBLICATIONS

Chinese Office Action in Chinese Application No. 201810482202.2 dated Jul. 20, 2021 with English translation.

Zhang, Research on Autonomous Navigation Method for Outdoor Unmanned Vehicle, published in Information Science and Technology, Jul. 16-Aug. 15, 2017, 9 pages, Issue 8.

Wolcot et al., Visual Localization within LIDAR Maps for Automated Urban Driving, 8 pages.

* cited by examiner

POSITIONING METHOD, POSITIONING APPARATUS, POSITIONING SYSTEM, STORAGE MEDIUM, AND METHOD FOR CONSTRUCTING OFFLINE MAP DATABASE

CROSS REFERENCE TO RELATED APPLICATIONS

This application is the National Stage of PCT/CN2019/087411 filed on May 17, 2019, which claims priority under 35 U.S.C. § 119 of Chinese Application No. 201810482202.2 filed on May 18, 2018, the disclosure of which is incorporated by reference.

TECHNICAL FIELD

Embodiments of the present disclosure relate to a positioning method, a positioning device, a positioning system, a storage medium, and a construction method for an offline map database.

BACKGROUND

Conventional positioning methods often acquire positions of users by means of GPS satellite positioning. With the development of the cities and the increasingly large scale of constructions, the needs on indoor positioning becomes increasingly higher.

SUMMARY

At least one embodiment of the present disclosure provides a positioning method, including: obtaining a current image information, and extracting a visual feature in the current image information; matching the visual feature in the current image information with a key frame in an offline map database, and determining a candidate key frame similar to the visual feature in the current image information, in which the offline map database is generated based on a global grid map and a visual map; and determining a pose corresponding to the candidate key frame, and converting the pose to coordinate values.

For example, in the positioning method provided by at least one embodiment of the present disclosure, the positioning method is used in an indoor environment.

For example, in the positioning method provided by at least one embodiment of the present disclosure, the current image information includes a current indoor image information.

For example, in the positioning method provided by at least one embodiment of the present disclosure, a server receives the current image information transmitted by a mobile terminal, and extracts the visual feature in the current image information.

For example, in the positioning method provided by at least one embodiment of the present disclosure, the coordinate values are transmitted by the server to the mobile terminal after converting the pose to the coordinate value.

For example, in the positioning method provided by at least one embodiment of the present disclosure, the candidate key frame similar to the visual feature in the current image information is determined by a bag-of-visual-words model matching algorithm.

For example, the positioning method provided by at least one embodiment of the present disclosure, further includes obtaining the global grid map constructed by a laser radar; obtaining the visual map constructed by a visual system; and generating the offline map database according to the global grid map and the visual map.

For example, in the positioning method provided by at least one embodiment of the present disclosure, obtaining the global grid map constructed by the laser radar comprises: initializing a coordinate system of a map provided by the laser radar into a global coordinate system; estimating a first positioning information of an environmental area scanned by the laser radar, and using the first positioning information as an input of particle filter sampling to obtain a prior distribution of particles; and generating the particles according to the prior distribution of the particles, and updating a particle pose and map data, according to the particle filter algorithm, by merging of an odometer pose transformation, to generate the global grid map.

For example, in the positioning method provided by at least one embodiment of the present disclosure, obtaining the visual map constructed by the visual system includes: initializing a video camera device, and obtaining a conversion relationship between a coordinate system of the visual map and a coordinate system of the global grid map according to a relative installation position of the video camera device and the laser radar; determining the key frame according to an inter-frame feature of image frames obtained by the video camera device, and determining a second positioning information of the key frame according to the conversion relationship; determining a modified scale factor according to the positioning information of the laser radar and the video camera device; and establishing a sparse map according to the modified scale factor and the key frame.

For example, in the positioning method provided by at least one embodiment of the present disclosure, construction of the global grid map by the laser radar and construction of the visual map by the visual system are performed in parallel; the positioning method further includes optimizing the coordinate values corresponding to the key frames by using loop detection.

For example, the positioning method provided by at least one embodiment of the present disclosure, further includes: if the candidate key frame similar to the visual feature is not determined when the visual feature is matched with the key frames in the offline map database, obtaining a velocity information and an angle information of adjacent frames before and after the current image information, and extrapolating coordinate values of the current image information according to the velocity information and the angle information.

At least one embodiment of the present disclosure also provides a positioning device, including: an obtaining unit, configured to obtain a current image information; an extraction unit, configured to extract a visual feature in the current image information; a matching unit, configured to match the visual feature in the current image information extracted by the extraction unit with a key frame in an offline map database; a first determining unit, configured to determine a candidate key frame that is similar to the visual feature in the current image information; a second determining unit, configured to determine a pose corresponding to the candidate key frame determined by the first determining unit; and a conversion unit, configured to convert the pose determined by the second determining unit to coordinate values.

For example, in the positioning device provided by at least one embodiment of the present disclosure, wherein the obtaining unit is configured to receive, by a server, the current image information transmitted by a mobile terminal to obtain the current image information.

For example, the positioning device provided by at least one embodiment of the present disclosure, further includes: a transmitting unit, configured to transmit the coordinate values converted by the conversion unit to the mobile terminal; a first constructing unit, configured to enable a laser radar to construct a global grid map; a second constructing unit, configured to enable a visual system to construct a visual map; a generating unit, configured to generate an offline map database according to the global grid map constructed by the first constructing unit and the visual map constructed by the second constructing unit; and a processing unit, configured to, if the candidate key frame similar to the visual feature is not determined when the visual feature is matched with the key frames in the offline map database, obtain a velocity information and an angle information of adjacent frames before and after the current image information, and extrapolate coordinate values of the current image information according to the velocity information and the angle information.

At least one embodiment of the present disclosure also provides a positioning device, including: a processor; and a memory storing one or more computer program modules, wherein the one or more computer program modules are stored in the machine-readable storage medium and configured to be executed by the processor, and the one or more computer program modules includes instructions that implement the positioning method provided by any one of embodiments of the present disclosure.

At least one embodiment of the present disclosure also provides a positioning system, including: a mobile terminal and a server, wherein the mobile terminal is configured to collect a current image information and transmit a visual feature in the current image information to the server; the server is configured to receive the current image information transmitted by the mobile terminal and extract the visual feature in the current image information; match the visual feature in the current image information with a key frame in an offline map database, and determine a candidate key frame similar to the visual feature in the current image information, wherein the offline map database is generated according to a global grid map and a visual map; and determine a pose corresponding to the candidate key frame, convert the pose to coordinate values, and transmit the coordinate values to the mobile terminal.

At least one embodiment of the present disclosure also provides a storage medium non-transitorily storing computer-readable instructions, the non-transitory computer-readable instructions, when executed by a computer, perform the positioning method provided by any one of embodiments of the present disclosure.

At least one embodiment of the present disclosure also provides a construction method for an offline map database, comprising: enabling a laser radar to construct a global grid map; enabling a visual system to construct a visual map; and generating the offline map database according to the global grid map and the visual map.

For example, in the construction method provided by at least one embodiments of the present disclosure, enabling the laser radar to construct the global grid map comprises: initializing a coordinate system of a map constructed by the laser radar into a global coordinate system; estimating a first positioning information of an environmental area scanned by the laser radar, and using the first positioning information as an input of particle filter sampling to obtain a prior distribution of particles; generating the particles according to the prior distribution of the particles, and updating a particle pose and map data, according to a particle filter algorithm by merging an odometer pose transformation, to generate the global grid map; in which enabling a visual system to construct a visual map, includes: initializing a video camera device, and obtaining a conversion relationship between the coordinate system of the visual map and the coordinate system of the global grid map according to a relative installation position of the video camera device and the laser radar; determining the key frame according to an inter-frame feature of image frames obtained by the video camera device, and determining a second positioning information of the key frame according to the conversion relationship; determining a modified scale factor according to the positioning information of the laser radar and the video camera device; and establishing a sparse map according to the modified scale factor and the key frame.

For example, in the construction method provided by at least one embodiment of the present disclosure, enabling the laser radar to construct the global grid map and enabling the visual system to construct the visual map are performed in parallel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1A:
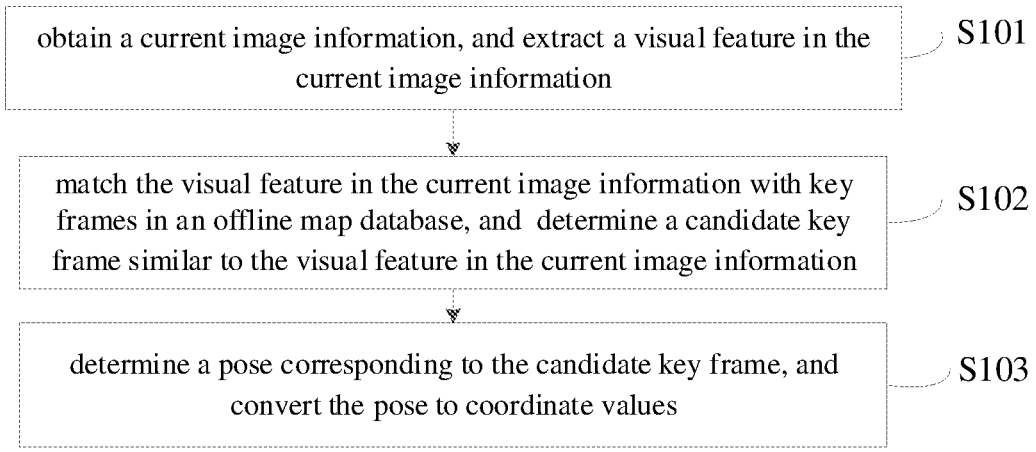
FIG. 1A shows a flowchart of a positioning method provided by at least one embodiment of the present disclosure.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Below, exemplary embodiments of the present disclosure will be described in more details with reference to the accompanying figures. Although exemplary embodiments of the present disclosure are shown in the figures, it should be understood that the present disclosure can be implemented in various forms and should not be limited by the embodiments set forth herein. On the contrary, these embodiments are provided in order to enable a more thorough understanding of the present disclosure, and enable to fully convey the scope of the present disclosure to those skilled in the art.

At present, due to the inferior receptivity of GPS signals indoors, GPS positioning can be inaccurate or the GPS positioning system cannot be used. Therefore, the authenticity and the accuracy of GPS positioning data might not meet the commercial requirements under indoor environment or other environments with poor receptivity.

At least one embodiment of the present disclosure provides a positioning method, including: obtaining a current image information, and extracting a visual feature in the current image information; matching the visual feature in the current image information with a key frame in an offline map database, and determining a candidate key frame similar to the visual feature in the current image information, in which the offline map database is generated based on a global grid map and a visual map; and determining a pose corresponding to the candidate key frame, and converting the pose to coordinate values.

At least one embodiment of the present disclosure also provides a positioning device, a positioning system, and a storage medium corresponding to the above-mentioned positioning method.

The positioning method provided by the above-mentioned embodiments of the present disclosure can determine its corresponding coordinate values by analyzing of the current image information to achieve accurate positioning.

The embodiments of the present disclosure will be illustrated in detail below with reference to the figures.

At least one embodiment of the present disclosure provides a positioning method. For example, the positioning method may be used for positioning in an indoor environment and may also be used for positioning in other outdoor environments. The embodiments of the present disclosure are not limited thereto. Below, description is made by an example where the positioning method is used in an indoor environment. For example, the positioning method may be at least partly implemented in software manners, and loaded and executed by a processor in the positioning device, or at least partly implemented in hardware or firmware manners to achieve accurate positioning.

FIG. 1A is a flowchart of a positioning method provided by at least one embodiment of the present disclosure. As shown in FIG. 1A, the positioning method includes steps S101 to S103. Steps S101 to S103 of the positioning method and their respective exemplary implementations are introduced below.

Step S101: obtain a current image information, and extract a visual feature in the current image information.

Step S102: match the visual feature with a key frame in an offline map database, and determine a candidate key frame similar to the visual feature.

Step S103: determine a pose corresponding to the candidate key frame, and convert the pose to coordinate values.

For example, depending on the actual situations, the current image information may include a current indoor image information when the positioning method is used in an indoor environment, and the current image information may include a current outdoor image information when the positioning method is used in an outdoor environment. The embodiments of the present disclosure are not limited thereto. Below, description is made by an example where the current image information includes the indoor image information, but the embodiments of the present disclosure are not limited thereto.

For example, in some examples, a server may receive the current image information (i.e., obtaining the current image information) transmitted by an mobile terminal, and a subsequent positioning method is executed by a processor, such as a central processing unit (CPU), in the server. In some other examples, the current image information can also be obtained by a device, such as a video camera, in the mobile terminal, and a subsequent positioning method is directly executed by a processor, such as a central processing unit (CPU), in the mobile terminal. Below, description is made by taking the following as example: the server receives the current image information (i.e., obtaining the current image information) transmitted by the mobile terminal, and a subsequent positioning method is executed by the processor, such as the central processing unit (CPU), in the server. But the embodiments of the present disclosure are not limited thereto.

For example, when the server receives the current image information transmitted by the mobile terminal, after the pose is converted to coordinate values, the coordinate values are transmitted by the server to the mobile terminal to carry out the positioning.

For step S101, for example, a user transmits the current indoor image information captured by the user to a back-end server by an application in the mobile terminal apparatus. For example, when the capturing is performed, the mobile apparatus can be either hand-held or fixed to a shopping cart, which ensures a certain angle of elevation with respect to a horizontal plane during capturing. The purpose is that if a video camera head is parallel to the horizontal plane, the current indoor image information captured by the user may capture the flow of the crowd, which will influence the accuracy of the positioning information. In an embodiment of the present disclosure, the mobile terminal can be a mobile phone, a tablet, or the like. For example, the current indoor image information can be captured by using the video camera device of the mobile terminal or other individual video camera device.

The server receives the current indoor image information transmitted by the mobile terminal, analyzes the current indoor image information, and extracts the visual feature in the current indoor image information. The extraction of the visual feature can be implemented by the following method: such as, an ORB (Oriented FAST and Rotated BRIEF) feature, however the method is not limited thereto. Specific implementations related to the ORB feature can refer to related description in the art, and the embodiments of the present disclosure will not be repeated herein.

For example, the server may image-preprocess the received current indoor image information before analyzing the current indoor image information, or may image-preprocess the current indoor image information after the mobile terminal obtains the current indoor image information, and then transmit the image-preprocessed current indoor image information to the server to improve the processing speed of the server. The embodiments of the present disclosure are not limited thereto.

For example, an obtaining unit and an extraction unit can be provided, and the current image information is obtained by the obtaining unit, and the visual feature in the current image information is extracted by the extraction unit. For example, the obtaining unit and the extraction unit can be implemented by means of a central processing unit (CPU), a graphic processor (GPU)), a tensor processor (TPU), a field programmable logic gate array (FPGA), or other forms of processing unit with data processing capability and/or instruction execution capability, and corresponding computer instructions. For example, the processing unit may be a general-purpose processor or a special-purpose processor, and may be a processor based on X86 or ARM architecture, and the like.

For step S102, for example, when constructing an offline map database, all key frames in the indoor environment are stored. For example, in a shopping mall, key frames of the image information on each of floors and key frames of image information on each of roads are stored. For example, after extracting the visual feature at step 101, the server matches the visual features of the current image information with the visual features in the key frames in the offline large map database, and determines a key frame containing a visual feature similar to the visual feature of the current image information as a candidate key frame.

The determination of the candidate key frame may be performed by using an exclusion method, but the embodiments of the present disclosure are not limited thereto, and other methods in the art may also be used, which will not be repeated herein. For example, the exclusion method may include: excluding the least relevant or the least similar key frame according to the visual feature in the current image information, narrowing a search range, and then matching the candidate key frame within a smaller range. There may be a plurality of the candidate key frames that are firstly determined, but only one candidate key frame that is finally confirmed, and this candidate key frame is the key frame that is most similar to the visual feature of the current image information, or identical to the visual feature of the current image information.

For example, the visual features in the current indoor image information are matched with the visual features of each of key frames by means of a bag-of-visual-words model (BOVW). If the similar or identical visual features in both the current indoor image information and the key frames reach a certain amount (for example. 80% of the total visual features), then the key frame is determined as the candidate key frame. For example, the bag-of-visual-words model can be set in advance by using algorithms in the art, which will not be repeated herein.

For example, a matching unit and a first determining unit can be provided, and the visual feature is matched with the key frames in the map database by the matching unit, and a candidate key frame similar to the visual feature is determined by the first determining unit. For example, the matching unit and the first determining unit can be implemented by means of a central processing unit (CPU), a graphic processor (GPU)), a tensor processor (TPU), a field programmable logic gate array (FPGA), or other forms of processing unit with data processing capability and/or instruction execution capability, and corresponding computer instructions.

For step S103, for example, a feature point matching iterative algorithm under an RANSAC framework is used to solve a pose. If the key frame has enough internal points, the pose optimized by the key frame is selected as the user's current pose. For example, the feature point matching iterative algorithm under the RANSAC framework can be implemented by using algorithms in the art, which will not be repeated herein.

For example, the pose can include the spatial coordinates and the capturing angle of the video camera device on the mobile terminal apparatus of the user and the like. In other words, the pose may represent the spatial coordinates of the user.

For example, after determining the pose corresponding to the candidate key frame, the pose is converted to the coordinate values of the user. For example, the server transmits back the plane projection coordinate values of the solved pose to the mobile terminal apparatus of the user by means of wireless transmission such as Bluetooth, WiFi and the like. For example, the coordinate origin of the coordinate values is set at the upper left corner of the current image information.

For example, a second determining unit and a conversion unit can be provided, and the pose corresponding to the candidate key frame is determined by the second determining unit, and the pose is converted to coordinate values by the conversion unit. For example, the second determining unit and the conversion unit can be implemented by means of a central processing unit (CPU), a graphic processor (GPU)), a tensor processor (TPU), a field programmable logic gate array (FPGA), or other forms of processing unit with data processing capability and/or instruction execution capability, and corresponding computer instructions.

For example, when the server performs the above-mentioned steps, a transmitting unit may also be provided, and the coordinate values converted by the conversion unit are transmitted to the mobile terminal by the transmitted unit. For example, the transmitting unit can be implemented as wireless or wired transmission, but the embodiments of the present disclosure are not limited thereto.

The positioning method provided by the present disclosure can obtain a current indoor image information; extract a visual feature in the current indoor image information; match the visual feature with key frames in the offline map database; determine a candidate key frame similar to the visual feature; determine a pose corresponding to the candidate key frame; and convert the pose to coordinate values. Therefore, the positioning method can determine the corresponding indoor coordinate values thereof by analyzing the current indoor image information and thereby realizing indoor positioning accurately.

For example, in some examples, the generation of the offline map database may be implemented by, but not limited to, for example, enabling a laser radar to construct a global grid map, enabling a visual system to construct a visual map, and generating an offline map according to the global grid map and the visual map.

Figure 1B:
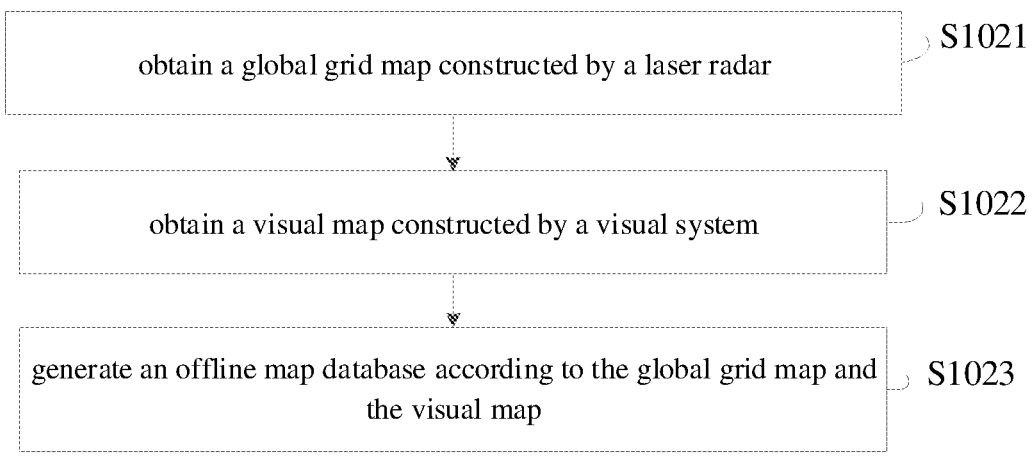
FIG. 1B is a flowchart of some examples of step S102 shown in FIG. 1A.

In an embodiment of the present disclosure, the offline map database is used as a basis for real-time indoor positioning. The offline map database includes two parts: the global grid map and the visual map. The construction method of the global grid map and the visual map will be explained in details below. FIG. 1B is a flowchart of obtaining an offline map database provided by at least one embodiment of the present disclosure. In other words, FIG. 1B is a flowchart of some examples of step S102 shown in FIG. 1A. In some implementations, as shown in FIG. 1B, the above-mentioned steps S102 includes steps S1021 to S1023.

Step S1021: obtain a global grid map constructed by a laser radar.

For example, step S1021 includes: initializing a coordinate system of the map constructed by the laser radar map into a global coordinate system. The purpose is that since the coordinate system of the map constructed by the laser radar and the coordinate system of the video camera device may differ, both of them are initialized as the global coordinate systems, thereby unifying the current image information in the global grid map and in the visual map by using the same coordinate position.

A first positioning information of an environmental area scanned by the laser radar is estimated, and the first positioning information is used as an input of particle filter sampling to obtain a prior distribution of particles. The particles are generated according to the prior distribution of the particles, and a pose and a map data of the particles are updated, according to a particle filter algorithm by merging an odometer pose transformation, to generate the global grid map. For example, the odometer pose transformation means the method of obtaining a pose by the odometer, which can be implemented by using some methods in the art, and will not be repeated here.

Figure 3:
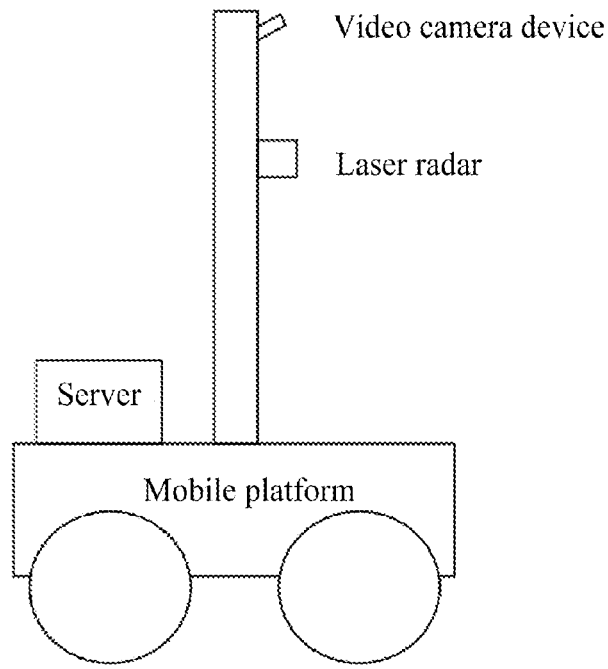
FIG. 3 shows a schematic diagram of a robot platform provided by at least one embodiment of the present disclosure.

In a specific implementation, the laser radar and the video camera head are installed on a robot system that can be moved autonomously or remotely, and the pose is obtained by using the odometry information of the robot system. For example, as shown in FIG. 3, the scanning plane of the laser radar is parallel to the horizontal plane, and an installation position of the video camera head has a certain angle of elevation with respect to the horizontal plane, such as in a direction towards higher shelves and/or ceilings in a supermarket, for the purpose of avoiding dynamics regions where people are crowded, and establishing maps for regions with smaller changes in the spatial environment. The robot needs to continuously move in an indoor space until it covers the entire area, thereby constructing the offline map database that merges a three-dimensional visual map data and a two-dimensional grid map.

By matching the data scanned by laser radar during the movement of the robot, a rough positioning result of laser radar is obtained, and this positioning result is used as an input of a particle filter sampling step, that is, generation of the prior distribution of particles. The particles are generated based on the above-mentioned prior distribution, and based on a particle filter algorithm, a particle pose and a map data are updated by merging the odometry pose transform, and the particle filter sampling inputs are continuously repeated to obtain the prior distribution of the particles. The particles are generated according to the prior distribution of the particles, and the particle pose and the map data are updated according to the particle filter algorithm by merging the odometer pose transformation, and finally the generated global two-dimensional grid map data are saved.

For example, t robot may upload the global grid map and visual map obtained by the robot to the server to construct an offline map database, or may construct an offline map database by its own internal processor. The embodiments of the present disclosure are not limited thereto.

Step S1022: obtain a visual map constructed by a visual system.

For example, the step S1022 specifically includes: initializing the video camera device, and the robot system remaining stationary until both the initialization of the coordinate system of the laser radar and the initialization of the coordinate system of the video camera device located on the robot system have been completed; obtaining a conversion relationship between the coordinate system of the visual map and the coordinate system of the global grid map according to a relative installation position of the video camera device and the laser radar; determining the key frames according to an inter-frame feature of image frames obtained by the video camera device, and determining a second positioning information of the key frames according to the conversion relationship; determining a modified scale factor according to the positioning information of the laser radar and the video camera device; and establishing a sparse map, i.e., sparse visual offline map data, according to the modified scale factor and the key frames.

In a specific implementation, since most mobile terminals are monocular cameras, the positioning result of the monocular camera thus needs to be modified. The specific modified method includes: setting an initial movement process to $\Delta t$, a change in the movement obtained by using the laser radar positioning result is ($\Delta x\_1, \Delta y\_1$), a change in the movement obtained by using the visual positioning result is ($\Delta x\_2, \Delta y\_2$), and the modified scale factor is:

$$\rho = \frac{\sqrt{\Delta x_1^2 + \Delta y_1^2}}{\sqrt{\Delta x_2^2 + \Delta y_2^2}},$$

update the position of the obtained key frame according to the modified scale factor.

In an embodiment of the present disclosure, as the optimization of the local sparse map, the coordinate values corresponding to the key frame are optimized by using a loop detection method, and the position coordinate of the key frame and the three-dimensional sparse point map data in the global coordinate system are finally obtained. For example, the loop detection method can be implemented using some methods in the art, which will not be repeated herein.

It should be noted that the laser radar map constructing (the above-mentioned step S1021) and the visual map constructing (the above-mentioned step S1022) are performed synchronously as two threads, so that speed of constructing the map can be increased.

Step S1023: generate an offline map database according to the global grid map and the visual map.

For example, the offline map database merges the three-dimensional visual map data (visual map) and the two-dimensional grid map (global grid map).

It should be noted that the steps of constructing the offline map database only need to be run once for generation of the offline map database at the very beginning of the system generation, or run again for updating of the offline map database when the environment changes. When the subsequent indoor positioning is performed, the generated offline map database or the updated offline map database can be directly used.

Figure 2:
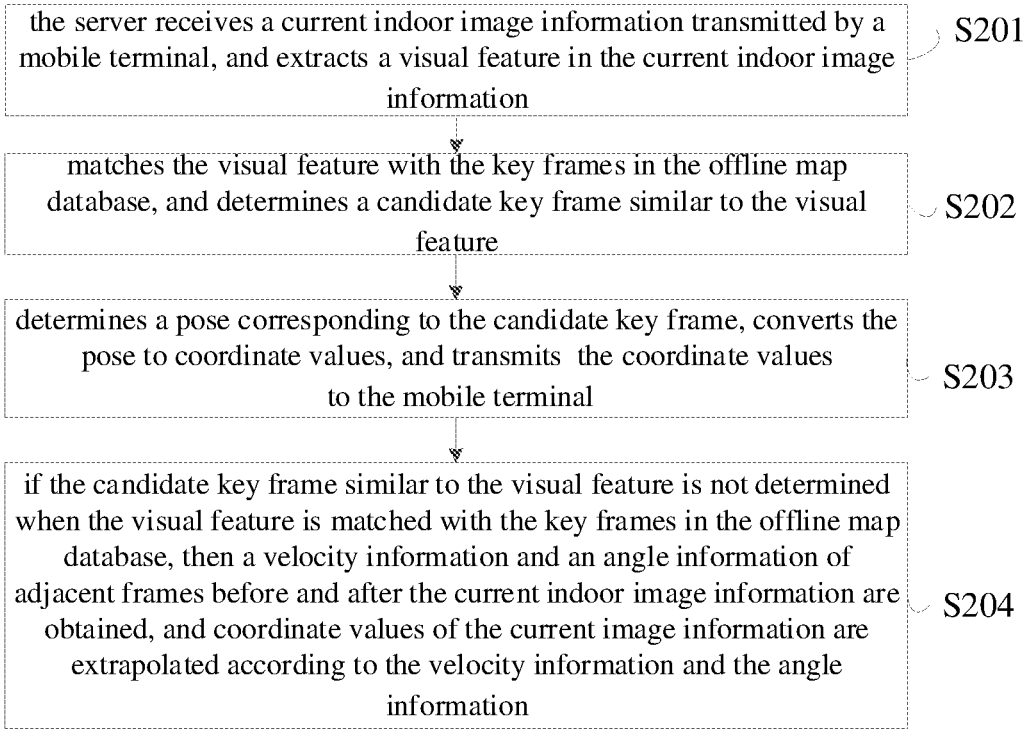
FIG. 2 shows a flowchart of another positioning method provided by at least one embodiment of the present disclosure.

At least one embodiment of the present disclosure also provides another positioning method. As shown in FIG. 2, the positioning method further includes steps S201 to S204. Steps S201 to S204 of the positioning method and their respectively exemplary implementations are described below, separately.

Step S201: the server receives a current indoor image information transmitted by a mobile terminal, and extracts a visual feature in the current indoor image information (refer to step 101).

Step S202: matches the visual feature with the key frames in the offline map database, and determines a candidate key frame similar to the visual feature (refer to step 102).

Step S203: determines a pose corresponding to the candidate key frame, converts the pose to coordinate values, and transmits the coordinate values to the mobile terminal (refer to step 103).

Step S204: if the candidate key frame similar to the visual feature is not determined when the visual feature is matched with the key frames in the offline map database, then a velocity information and an angle information of adjacent frames before and after the current indoor image information are obtained, and coordinate values of the current image information are extrapolated according to the velocity information and the angle information (i.e., the coordinate values of the user at the current indoor image information).

The foregoing steps S201 to S203 are similar to steps S101 and S103, which will not be repeated herein.

For step S204, since the mobile terminal apparatus is generally an ordinary rolling shutter video camera head, the image obscuration easily occurs when the velocity of movement is too fast or the rotation is fast, resulting in failures of the server in matching when the extraction of the key frame is performed, thereby resulting in failures in positioning tracking. Therefore, it is required to reinitialize the matching positioning.

For example, the velocity information and the angle information of the adjacent frames before and after the current indoor image information are obtained by sensors in the mobile terminal.

In order to solve the above-mentioned problem, the embodiments of the present disclosure combine sensor information, such as an acceleration and a gyroscope, etc., of the mobile terminal, and uses the position coordinate obtained by the latest (k−1)-th frame, and the acceleration information and the angle information of the k-th frame and the (k−1)-th frame, to extrapolate the position coordinates of the k-th frame and the (k+1)-th frame, when the current k-th frame image fails to be matched. Meanwhile, based on the position coordinate of the extrapolated (k+1)-th frame, a similar candidate frame that matches the (k+1)-th frame is screened, i.e., the candidate frame with a distance from the position coordinate extrapolated by the (k+1)-th frame that is beyond a certain threshold is excluded, thereby increasing speed of the image positioning initialization.

In the process of the positioning by matching the image information, the present disclosure combines an inertial sensor (an acceleration sensor and a gyroscope) that is built in the mobile terminal to narrow the screening range of matching candidate key frame in the positioning initialization stage, thereby increasing the positioning precision in the initialization stage.

For the method for determining the coordinate values of the user at the current indoor image in this step S204, reference can be made to the related description in the above-mentioned step S103, which will not be repeated herein.

In summary, in order to reduce the calculation amount of visual positioning in a large-range environment and improve the calculation real-time capability, the embodiments of the present disclosure combine the two-dimensional grid map constructed by the laser radar and the sparse visual map to construct the offline map. For example, the grid map is used for a path planning in the indoor environment, and provide scale correction for monocular visual positioning and map constructing, and the sparse visual offline map is used to match the image shot by the user's mobile phone, thereby obtaining the user's current position information. Compared with the positioning method only based on the laser radar or only based on the visual, the construction method of the offline map proposed in the embodiments of the present disclosure can not only achieve fast matching to obtain a real-time position information, but also meet requirements for the map of an indoor navigation.

At least one embodiment of the present disclosure also provides a positioning device. For example, the positioning device can be applied in an indoor environment, e.g., for use of positioning of the user according to the indoor image information. embodiment of the positioning device corresponds to the embodiment of the foregoing positioning method. For the ease of reading, embodiment of the device will not repeat the details of the embodiment of the foregoing method, but it should be clear that the positioning device in this embodiment may be able to implement the entire contents of the embodiment of the foregoing positioning method correspondingly.

Figure 4:
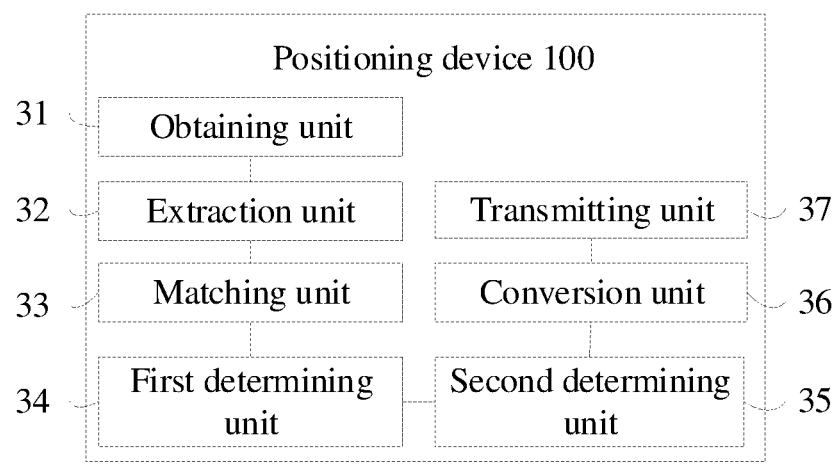
FIG. 4 shows a structural block diagram of a positioning device provided by at least one embodiment of the present disclosure.

FIG. 4 is a schematic block diagram of a positioning device according to at least one embodiment of the present disclosure. As shown in FIG. 4, in some embodiments, the positioning device 100 includes an obtaining unit 31, an extraction unit 32, a matching unit 33, a first determining unit 34, a second determining unit 35, and a conversion unit 36. In other embodiments, the positioning device 100 further includes a transmitting unit 37. For example, these units/modules can be implemented by using software, hardware, firmware and any combination thereof.

The obtaining unit 31 is configured to obtain a current image information. The extraction unit 32 is configured to extract a visual feature in the current image information. For example, the current image information may be a current indoor image information. For example, the obtaining unit 31 and the extraction unit 32 may implement step S101, and a specific implementation of which may refer to the related description of step S 101, which will not be repeated herein.

The matching unit 33 is configured to match the visual feature extracted by the extraction unit 32 with a key frame in the offline map database. The first determining unit 34 is configured to determine a candidate key frame similar to the visual feature in current image information, in the process when the matching unit 33 matches the visual feature with the key frame in the offline map database. For example, the matching unit 33 and the first determining unit 34 may implement step S102, and a specific implementation of which may refer to the related description of step S102, which will not be repeated herein.

The second determining unit 35 is configured to determine a pose corresponding to the candidate key frame determined by the first determining unit 34. The conversion unit 36 is configured to convert the pose determined by the second determining unit 35 to coordinate values. For example, the second determining unit 35 and the conversion unit 36 may implement step S103, and a specific implementation of which may refer to the related description of step S103, which will not be repeated herein.

For example, in other examples, the obtaining unit 31 is configured to receive, by a server, the current image information transmitted by a mobile terminal, i.e., when the server processes the positioning method shown for example in FIG. 1A, the positioning device 100 further includes the transmitting unit 37. In this example, the transmitting unit 37 is configured to transmit the coordinate values converted by the conversion unit 36 to the mobile terminal.

Figure 5:
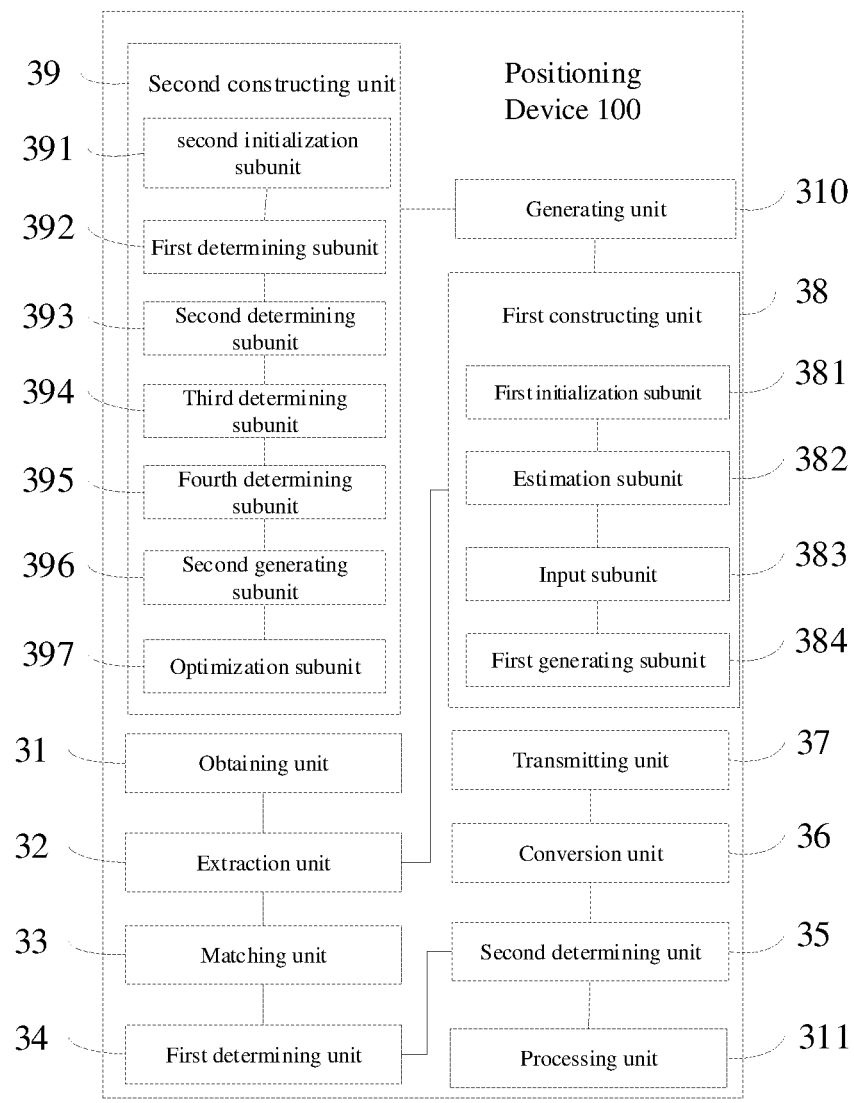
FIG. 5 shows a structural block diagram of another positioning device provided by at least one embodiment of the present disclosure.

For example, as shown in FIG. 5, in some examples, the positioning device 100 further includes a first constructing unit 38, a second constructing unit 39, and a generating unit 310.

The first constructing unit 38 is configured to enable a laser radar to construct a global grid map.

The second constructing unit 39 is configured to enable a visual system to construct a visual map.

The generating unit 310 is configured to generate an offline map database according to the global grid map constructed by the first constructing unit 38 and the visual map constructed by the second constructing unit 39.

For example, as shown in FIG. 5, in some examples, the first constructing unit 38 includes a first initialization subunit 381, an estimation subunit 382, an input subunit 383, and a first generating subunit 384.

The first initialization subunit 381 is configured to initialize a coordinate system of the map constructed by the laser radar into a global coordinate system.

The estimation subunit 382 is configured to estimate a first positioning information of an indoor area scanned by the laser radar.

The input subunit 383 is configured to use the first positioning information estimated by the estimation subunit 382 as an input of particle filter sampling to obtain the prior distribution of particles.

The first generating subunit 384 is configured to generate the particles according to the prior distribution of the particles, and update a particle pose and a map data according to a particle filter algorithm by merging an odometer pose transform, to generate the global grid map.

For example, as shown in FIG. 5, in some examples, the second constructing unit 39 includes a second initialization subunit 391, a first determining subunit 392, a second determining subunit 393, a third determining subunit 394, and a fourth determining subunit 395 and a second generating subunit 396.

The second initialization subunit 391 is configured to initialize a video camera device.

The first determining subunit 392 is configured to obtain a conversion relationship between the coordinate system of the visual map and the coordinate system of the global grid map according to a relative installation position of the video camera device and the laser radar.

The second determining subunit 393 is configured to determine a key frame according to an inter-frame feature of image frames obtained by the video camera device.

The third determining subunit 394 is configured to determine the second positioning information of the key frame according to the conversion relationship determined by the second determining subunit 393.

The fourth determining subunit 395 is configured to determine a modified scale factor according to the positioning information of the laser radar and the video camera device.

The second generating subunit 396 is configured to establish a sparse map according to the modified scale factor and the key frame determined by the fourth determining subunit 395.

For example, as shown in FIG. 5, in some examples, the second constructing unit 39 further includes: an optimization subunit 397.

For example, the optimization subunit 397 is configured to optimize the coordinate values corresponding to the key frames using the loop detection.

For example, as shown in FIG. 5, in some examples, the positioning device 100 further includes a processing unit 311.

For example, the processing unit 311 is configured to, obtain a velocity information and an angle information of adjacent frames before and after the current image information, and extrapolate coordinate values of the current image information according to the velocity information and the angle information when matching the visual feature with the key frames in the offline map database, if the candidate key frame similar to the visual feature is not determined.

It should be noted that the positioning device provided in the embodiments of the present disclosure can include more or fewer circuits or units, and connection relationships between the circuits or units is not limited, and can be determined according to actual requirements. The specific composition of each circuit is not limited, and it can be composed of an analog device, a digital chip, or in other applicable manners according to the circuit principle.

Figure 6:
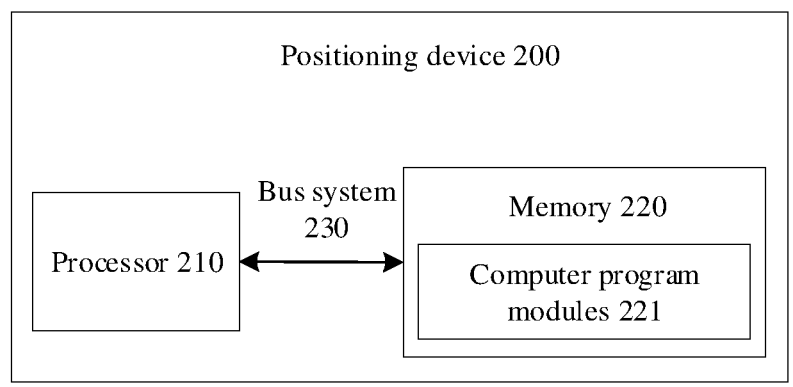
FIG. 6 shows a structural block diagram of yet another positioning device provided by at least one embodiment of the present disclosure.

FIG. 6 is a schematic block diagram of another positioning device according to at least one embodiment of the present disclosure. As shown in FIG. 6, the positioning device 200 includes a processor 210, a memory 220, and one or more computer program modules 221.

For example, the processor 210 and the memory 220 are connected via a bus system 230. For example, one or more computer program modules 221 are stored in the memory 220. For example, one or more computer program modules 221 includes instructions for executing the positioning method provided by any one of embodiments of the present disclosure. For example, the instructions in one or more computer program modules 221 can be executed by the processor 210. For example, the bus system 230 can include a commonly used serial communication bus, parallel communication bus and the like, but the embodiments of the present disclosure are not limited thereto.

For example, the processor 210 can be a central processing unit (CPU), a field programmable logic gate array (FPGA), or other forms of processing units with data processing capability and/or instruction execution capability, and can be a general-purpose processor or a special-purpose processing unit. The processor 210 is also able to control other components in the positioning device 200 to perform the desired functions.

The memory 220 can include one or more computer program products. The computer program product can include various forms of computer-readable storage media, such as volatile memory and/or non-volatile memory. The volatile memory may include, for example, a random access memory (RAM) and/or a cache memory (cache) and the like. The non-volatile memory may include, for example, a read-only memory (ROM), a hard disk, a flash memory, and the like. One or more computer program instructions can be stored on a computer-readable storage medium, and the processor 210 can execute the program instructions to implement the functions (implemented by the processor 210) and/or other desired functions in the embodiments of the present disclosure, such as, the positioning method and the like. Various applications and various data, such as beginning coordinates, end coordinates of various rectangular areas, and various data used and/or generated by the applications, can also be stored in the computer-readable storage medium.

It should be noted that, for sake of clarity and conciseness, the embodiments of the present disclosure do not give all of the component units of the positioning device 200. In order to realize the necessary functions of the positioning device 200, those skilled in the art may configure other component units not shown according to specific requirements, and the embodiments of the present disclosure are not limited thereto.

Regarding to the technical effects of the positioning device 100 and the positioning device 200 in different embodiments, reference may be made to the technical effects of the positioning method provided in the embodiments of the present disclosure, which will not be repeated herein.

Figure 7:
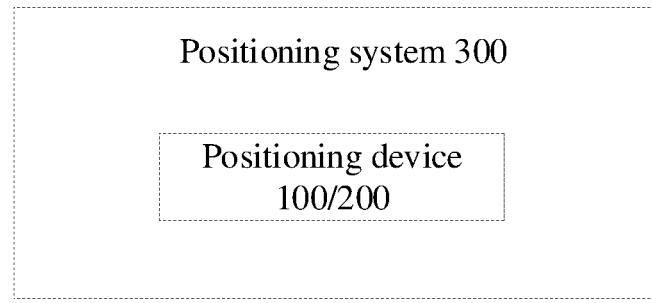
FIG. 7 shows a structural block diagram of a positioning system provided by at least one embodiment of the present disclosure.

At least one embodiment of the present disclosure also provides a positioning system. FIG. 7 is a schematic diagram of a positioning system provided by at least one embodiment of the present disclosure. As shown in FIG. 7, the positioning system 300 includes any one of the positioning devices 100/200 shown in FIG. 4 or FIG. 5, which can refer to the related descriptions in FIG. 4 to FIG. 5, and will not be repeated herein. For example, the positioning system 300 further includes a mobile terminal and a server (not shown in the figures).

The positioning device and system in the indoor environment provided by the present disclosure can determine a corresponding indoor coordinate values by analyzing the current indoor image information to realize accurate indoor positioning.

The above-mentioned positioning device includes the processor and the memory. The above-mentioned obtaining unit, the extraction unit, the matching unit, the first determining unit and the second determining unit, the conversion unit, the transmitting unit, etc., are all stored in the memory as program units, and the above program units stored in the memory are executed by the processor to implement respective functions.

The processor includes a kernel, by which the respective program units are retrieved from the memory. More than one kernel can be disposed, and accurate positioning of the indoor environment can be achieved by adjusting kernel parameters.

The memory may include forms of a non-persistent memory, a random access memory (RAM) and/or a non-volatile memory, etc. in a computer-readable medium, such as a read-only memory (ROM) or a flash memory (flash RAM) The memory includes at least one memory chip.

At least one embodiment of the present disclosure also provides a positioning system, including a mobile terminal and a server. For example, the mobile terminal is configured to acquire a current image information, and transmit the current image information to the server. The server is configured to receive the current image information, and extract the visual feature in the current image information transmitted by the mobile terminal, and match the visual feature in the current image information with a key frame in the offline map database to determine a candidate key frame similar to the visual feature in the current image information. The offline map database is generated according to a global grid map and a visual map. The server is further configured to determine a pose corresponding to the candidate key frame, and convert the pose to coordinate values, and transmit the coordinate values to the mobile terminal.

It should be noted that, detailed description of the functions and technical effects implemented by the mobile terminal and the server can refer to the related description of the positioning method in FIG. 1A, which will not be repeated herein.

Figure 8:
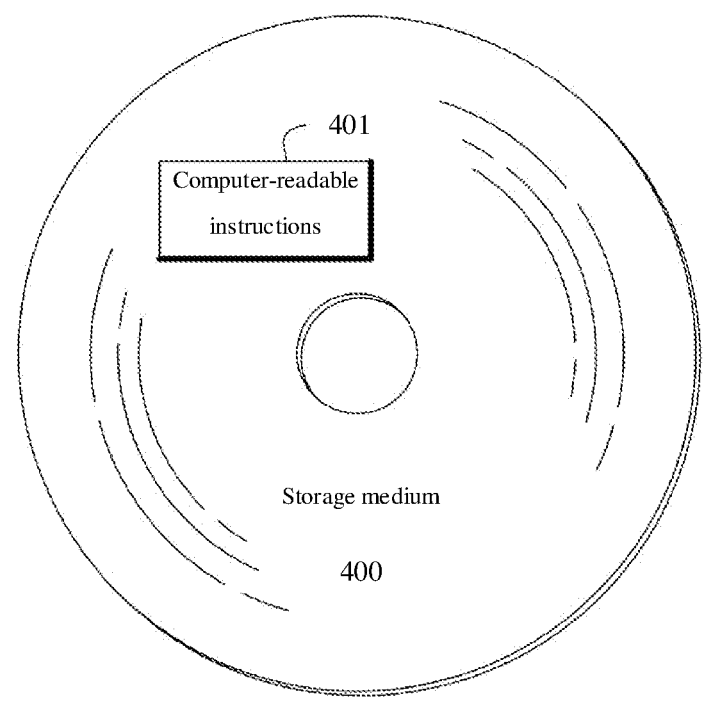
FIG. 8 is a schematic diagram of a storage medium provided by at least one embodiment of the present disclosure.

Some embodiments of the present disclosure also provide a storage medium. FIG. 8 is a schematic diagram of a storage medium provided by at least one embodiment of the present disclosure. For example, the storage medium 400 non-transitorily stores computer-readable instructions 401. When the non-transitory computer-readable instructions 401 are executed by a computer (including processor), the positioning method provided by any one of the embodiments of the present disclosure can be executed.

For example, this storage medium may be any combination of one or more computer-readable storage media. For example, one computer-readable storage medium contains a computer-readable program code for extracting a visual feature in the current image information, and another computer-readable storage medium contains a computer-readable program code for determining a candidate key frame similar to the visual feature in current image information. For example, when the program code is read by a computer, the computer can execute the program code stored in a computer storage medium, and execute, for example, the positioning method provided by any one of the embodiments of the present disclosure.

For example, the storage medium can includes a memory card of a smart phone, a storage part of a tablet, a hard disk of a personal computer, a random access memory (RAM), a read-only memory (ROM), an erasable programmable read-only memory (EPROM), a portable compact disc read-only memory (CD-ROM), a flash memory, or any combination of the above-mentioned storage media, and can also be other applicable storage media.

Technical effects of the storage medium provided by the embodiments of the present disclosure can refer to the corresponding description related to the positioning method in the above-mentioned embodiments, which will not be repeated herein.

At least one embodiment of the present disclosure also provides a construction method for an offline map database. For example, the construction method may be implemented by the first constructing unit 38 and the second constructing unit 39 described above, the details of which can refer to the above description, and will not be repeated herein. For example, the construction method for the offline map database includes: enabling a laser radar to construct a global grid map; enabling a visual system to construct a visual map; and generating an offline map database according to the global grid map and the visual map.

For example, in some examples, enabling the laser radar to construct the global grid map includes: initializing a coordinate system of a map constructed by the laser radar into a global coordinate system; estimating a first positioning information of an environmental area scanned by the laser radar, and using the first positioning information as an input of particle filter sampling to obtain a prior distribution of particles; generating the particles according to the prior distribution of the particles, and updating a particle pose and a map data, according to a particle filter algorithm by merging an odometer pose transformation, to generate the global grid map.

For example, in some examples, enabling the visual system to construct the visual map includes: initializing a video camera device, and obtaining a conversion relationship between the coordinate system of the visual map and the coordinate system of the global grid map according to a relative installation position of the video camera device and the laser radar; determining the key frame according to an inter-frame feature of image frames obtained by the video camera device, and determining a second positioning information of the key frame according to the conversion relationship; determining a modified scale factor according to the positioning information of the laser radar and the video camera device; and establishing a sparse map according to the modified scale factor and the key frame.

For example, in some examples, the construction method for the offline map database can optimize the coordinate values corresponding to the key frames by using a loop detection method.

For example, in some examples, enabling the laser radar to construct the global grid map and enabling the visual system to construct the visual map are performed in parallel.

For example, a detailed description of the construction method for the offline map database can refer to the description in FIG. 1B, and will not be repeated herein.

At least one embodiment of the present disclosure also provides an electronic apparatus, the apparatus comprising a processor, a memory, and programs stored on the memory and executed by the processor, in which the processor, when executing the programs, implements the positioning method provided by any one of embodiments of the present disclosure. Specific description can refer to the description of the above-mentioned positioning device 200, which will not be repeated herein.

The apparatus in the description can be a tablet, a mobile phone, etc.

At least one embodiment of the present disclosure also provides a computer program product that, when executed on a data processing apparatus, can implement the positioning method provided by any one of the embodiments of the present disclosure. Specific description can refer to the description of the above-mentioned positioning device 200, which will not be repeated herein.

The present disclosure is described with reference to flowcharts and/or block diagrams of the method, the apparatus (the system), and the computer program product according to the embodiments of the present disclosure. It should be understood that each process and/or block in the flowcharts and/or block diagrams, and combinations thereof can be implemented by the computer program instructions. These computer program instructions can be provided to a processor of a general-purpose computer, special-purpose computer, embedded handler, or other programmable data processing apparatuses to produce a machine, so that the instructions executed by the processor of the computer or other programmable data processing apparatuses produce a device that is used for implementing the functions specified in one or more flows of the flowchart and/or one or more blocks of the block diagram.

These computer program instructions may also be stored in a computer-readable memory that is capable of guiding a computer or other programmable data processing apparatuses to work in a particular manner, so that the instructions stored in the computer-readable memory produce a manufacture including a instruction device, the instruction device implements the functions specified in one or more flows of the flowchart and/or one or more blocks of the block diagram.

These computer program instructions can also be loaded on a computer or other programmable data processing apparatuses, so that a series of operation steps are performed on the computer or other programmable apparatuses to produce a computer-implemented processing, thereby the instructions executed on the computer or other programmable apparatuses providing steps that implement the functions specified in one or more flows of the flowchart and/or one or more blocks of the block diagram.

In a typical configuration, a computing apparatus includes one or more processors (CPUs), an input/output interface, a network interface, and a memory.

Those skilled in the art should understand that the embodiments of the present disclosure may be provided as the method, the system or the computer program product. Therefore, the present disclosure may take the form of an entirely hardware embodiment, an entirely software embodiment, or an embodiment with combining software and hardware aspects. Moreover, the present disclosure may take the form of a computer program product implemented on one or more computer available storage media (including but not limited to a disk memory, a CD-ROM, an optical memory, etc.) containing computer available program codes.

The following points need to be explained:

(1) The figures of the embodiments of the present disclosure only relate to the structures that are related to the embodiments of the present disclosure, but other structures can refer to the general design.

(2) Without confliction, the embodiments of the present disclosure and the features in the embodiments can be combined with each other to obtain a new embodiment.

The above-mentioned is only an exemplary implementation of the present disclosure, and is not intended to limit the protection scope of the present disclosure, which is determined by the appended claims.

What is claimed is:

1. A positioning method, comprising:
obtaining a current image information, and extracting a visual feature in the current image information;
matching the visual feature in the current image information with a key frame in an offline map database and determining a candidate key frame similar to the visual feature in the current image information, wherein the offline map database is generated based on a global grid map and a visual map; and
determining a pose corresponding to the candidate key frame, and converting the pose to coordinate values;
wherein a server receives the current image information transmitted by a mobile terminal, and extracts the visual feature in the current image information;
the positioning method further comprises:
obtaining the global grid map constructed by a laser radar;
obtaining the visual map constructed by a visual system; and
generating the offline map database according to the global grid map and the visual map;
wherein obtaining the global grid map constructed by the laser radar comprises:
initializing a coordinate system of a map provided by the laser radar into a global coordinate system;
estimating a first positioning information of an environmental area scanned by the laser radar, and using the first positioning information as an input of particle filter sampling to obtain a prior distribution of particles; and generating the particles according to the prior distribution of the particles, and updating a particle pose and map data, according to the particle filter algorithm by merging an odometer pose transformation, to generate the global grid map;

wherein obtaining the visual map constructed by the visual system comprises:

initializing a video camera device, and obtaining a conversion relationship between a coordinate system of the visual map and a coordinate system of the global grid map according to a relative installation position of the video camera device and the laser radar;

determining the key frame according to an inter-frame feature of image frames obtained by the video camera device, and determining a second positioning information of the key frame according to the conversion relationship;

determining a modified scale factor according to the positioning information of the laser radar and the video camera device; and establishing a sparse map according to the modified scale factor and the key frame.

2. The positioning method of claim 1, wherein the positioning method is used in an indoor environment.

3. The positioning method of claim 2, wherein the current image information comprises a current indoor image information.

4. The positioning method of claim 1, wherein the coordinate values are transmitted by the server to the mobile terminal after converting the pose to the coordinate values.

5. The positioning method of claim 1, wherein the candidate key frame similar to the visual feature in the current image information is determined by a bag-of-visual-words model matching algorithm.

6. The positioning method of claim 1, wherein construction of the global grid map by the laser radar and construction of the visual map by the visual system are performed in parallel;

the positioning method further comprises:
optimizing the coordinate values corresponding to the key frame by using loop detection.

7. The positioning method of claim 1, further comprising:
if the candidate key frame similar to the visual feature is not determined when the visual feature is matched with the key frames in the offline map database, obtaining a velocity information and an angle information of adjacent frames before and after the current image information, and extrapolating coordinate values of the current image information according to the velocity information and the angle information.

8. A non-transitory computer-readable storage medium storing instructions, the instructions, when executed by a computer, perform the positioning method according to claim 1.

9. A positioning device comprising:
a processor; and
a memory storing one or more computer program modules,
wherein the one or more computer program modules are stored in the machine-readable storage medium and configured to be executed by the processor, and the one or more computer program modules comprises instructions that implement a positioning method, comprising:

obtaining a current image information, and extracting a visual feature in the current image information;

matching the visual feature in the current image information with a key frame in an offline map database and determining a candidate key frame similar to the visual feature in the current image information, wherein the offline map database is generated based on a global grid map and a visual map; and determining a pose corresponding to the candidate key frame, and converting the pose to coordinate values;

wherein a server receives the current image information transmitted by a mobile terminal, and extracts the visual feature in the current image information;

the positioning method further comprises:
obtaining the global grid map constructed by a laser radar;

obtaining the visual map constructed by a visual system; and generating the offline map database according to the global grid map and the visual map;

wherein obtaining the global grid map constructed by the laser radar comprises:

initializing a coordinate system of a map provided by the laser radar into a global coordinate system;

estimating a first positioning information of an environmental area scanned by the laser radar, and using the first positioning information as an input of particle filter sampling to obtain a prior distribution of particles; and generating the particles according to the prior distribution of the particles, and updating a particle pose and map data, according to the particle filter algorithm by merging an odometer pose transformation, to generate the global grid map;

wherein obtaining the visual map constructed by the visual system comprises:

initializing a video camera device, and obtaining a conversion relationship between a coordinate system of the visual map and a coordinate system of the global grid map according to a relative installation position of the video camera device and the laser radar;

determining the key frame according to an inter-frame feature of image frames obtained by the video camera device, and determining a second positioning information of the key frame according to the conversion relationship;

determining a modified scale factor according to the positioning information of the laser radar and the video camera device; and establishing a sparse map according to the modified scale factor and the key frame.

10. A construction method for an offline map database, comprising:

enabling a laser radar to construct a global grid map;
enabling a visual system to construct a visual map; and
generating the offline map database according to the global grid map and the visual map;

wherein enabling the laser radar to construct the global grid map comprises:

initializing a coordinate system of a map constructed by the laser radar into a global coordinate system;

estimating a first positioning information of an environmental area scanned by the laser radar, and using the first positioning information as an input of particle filter sampling to obtain a prior distribution of particles;

generating the particles according to the prior distribution of the particles, and updating a particle pose and map data, according to a particle filter algorithm by merging an odometer pose transformation, to generate the global grid map;

wherein enabling the visual system to construct the visual map, comprises:

initializing a video camera device, and obtaining a conversion relationship between the coordinate system of the visual map and the coordinate system of the global grid map according to a relative installation position of the video camera device and the laser radar;

determining the key frame according to an inter-frame feature of image frames obtained by the video camera device, and determining a second positioning information of the key frame according to the conversion relationship;

determining a modified scale factor according to the positioning information of the laser radar and the video camera device; and establishing a sparse map according to the modified scale factor and the key frame.

11. The construction method of claim 10, wherein enabling the laser radar to construct the global grid map and enabling the visual system to construct the visual map are performed in parallel.

\* \* \* \* \*